(12) United States Patent
Tsukagoshi

(10) Patent No.: US 11,368,767 B2
(45) Date of Patent: Jun. 21, 2022

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/095,541

(22) Filed: Nov. 11, 2020

(65) Prior Publication Data

US 2021/0092495 A1 Mar. 25, 2021

Related U.S. Application Data

(63) Continuation of application No. 15/774,371, filed as application No. PCT/JP2016/087719 on Dec. 19, 2016, now Pat. No. 10,887,670.

(30) Foreign Application Priority Data

Dec. 28, 2015 (JP) ................. 2015-257206

(51) Int. Cl.
*H04N 19/103* (2014.01)
*H04N 19/186* (2014.01)
(Continued)

(52) U.S. Cl.
CPC ....... *H04N 21/8451* (2013.01); *H04N 19/103* (2014.11); *H04N 19/186* (2014.11);
(Continued)

(58) Field of Classification Search
None
See application file for complete search history.

(56) References Cited

U.S. PATENT DOCUMENTS

2014/0079113 A1 3/2014 Newton et al.
2016/0301959 A1 10/2016 Oh et al.
2017/0264859 A1* 9/2017 Drugeon ............ H04N 21/4345

FOREIGN PATENT DOCUMENTS

EP 2947560 A1 7/2019
WO WO 2007/139534 A1 12/2007
(Continued)

OTHER PUBLICATIONS

Rajan Joshi et al., "Information technology—High efficiency coding and media delivery in heterogeneous environments—Part 2: High efficiency video coding", Joint Collaborative Team on Video Coding (JCT-VC) of ITU-T 16 WP 3 and ISO/IEC JTC 1/SC 29/WG 11, JCTVC-U1005_r1, ISO/IEC DIS23008-2:201X, $3^{rd}$ Edition, 21st Meeting Warsaw, PL., Jun. 19-26, 2015 (607 pages).
(Continued)

*Primary Examiner* — Christopher Braniff
(74) *Attorney, Agent, or Firm* — Oblon, McClelland, Maier & Neustadt, L.L.P.

(57) ABSTRACT

A transmission apparatus includes circuitry configured to perform high dynamic range (HDR) opto-electronic conversion on HDR video data to obtain HDR transmission video data. An encoder receives input of at least the HDR transmission video data and output a video stream including coded video data, and a transmitter sends the video stream. The circuitry is further configured to insert HDR conversion characteristic meta-information into the video stream, the HDR conversion characteristic meta-information indicating a characteristic of the HDR conversion.

24 Claims, 10 Drawing Sheets

(51) Int. Cl.

| | |
|---|---|
| *H04N 19/30* | (2014.01) |
| *H04N 19/46* | (2014.01) |
| *H04N 19/70* | (2014.01) |
| *H04N 19/85* | (2014.01) |
| *H04N 19/98* | (2014.01) |
| *H04N 21/845* | (2011.01) |
| *H04N 21/2343* | (2011.01) |
| *H04N 21/6547* | (2011.01) |
| *H04N 21/2365* | (2011.01) |
| *H04N 21/235* | (2011.01) |

(52) U.S. Cl.
CPC .............. *H04N 19/30* (2014.11); *H04N 19/46* (2014.11); *H04N 19/70* (2014.11); *H04N 19/85* (2014.11); *H04N 19/98* (2014.11); *H04N 21/2353* (2013.01); *H04N 21/2365* (2013.01); *H04N 21/234309* (2013.01); *H04N 21/234327* (2013.01); *H04N 21/6547* (2013.01)

(56) References Cited

FOREIGN PATENT DOCUMENTS

| | | |
|---|---|---|
| WO | WO2013/046096 A1 | 4/2013 |
| WO | WO 2015/034188 A1 | 3/2015 |
| WO | WO 2015/072754 A1 | 5/2015 |
| WO | WO 2015072754 A1 | 5/2015 |
| WO | WO 2015/118909 A1 | 8/2015 |
| WO | WO 2015/125719 A1 | 8/2015 |
| WO | WO 2015118909 A1 | 8/2015 |
| WO | WO 2015/190246 A1 | 12/2015 |

OTHER PUBLICATIONS

M. Zink et al., "Managing HDR Content Production Display Device Capabilities", Warner Bros., USA; Wavelet Consulting LLC, USA, Mar. 27, 2017 (12 pages).

Matteo Naccari, et al., "High dynamic range compatibility information SEI message," Joint Collaborative Team on Video Coding (JCT-VC) of ITU-T SG 16 WP 3 and ISO/IEC JTC 1/SC 29/WG 11, 21$^{st}$ Meeting, No. JCTVC-U0033, Jun. 9, 2015, XP030117445, pp. 1-9.

Tim Borer, "Non-Linear Opto-Electrical Transfer Functions for High Dynamic Range Television," Research & Development White Paper WHP 283, British Broadcasting Corporation, Jul. 2014, 23 pages.

International Search Report dated May 17, 2017 in PCT/JP2016/087719 filed Dec. 19, 2016.

Office Action dated Jun. 4, 2019 in corresponding Japanese Patent Application No. 2015-257206 (with English Translation), 12 pages.

Japanese Office Action dated Nov. 12, 2019 in Japanese Patent Application No. 2015-257206 (with English translation), 10 pages.

European Office Action dated Oct. 25, 2019 in European Patent Application No. 16828793.6, 7 pages.

CEA Standard, "CEA—861.3 HDR Static Metadata Extensions", Jan. 2015 (18 pages).

Japanese Office Action dated Mar. 30, 2021 in Japanese Patent Application No. 2020-089714 (submitting English translation only), 4 pages.

"Media transport systems using MMT, ARIB STD-B60" General Incorporated Radio Industries Association, 1.5 edition, in digital broadcasting, Japan, Dec. 3, 2015, p. 132 and cover pages.

\* cited by examiner

Dynamic Range SEI

| Syntax | No. of Bits | Format |
|---|---|---|
| Dynamic Range SEI  (){ | | |
| transfer_characteristics2 | 8 | uimsbf |
| number_of_bits | 8 | uimsbf |
| minimum_brightness_value | 16 | uimsbf |
| peak_level | 16 | uimsbf |
| peak_level_brightness | 16 | uimsbf |
| compliant_threshold_level | 16 | uimslbf |
| compliant_threshold_level_value | 16 | uimslbf |
| } | | |

FIG.5

| semantics | |
|---|---|
| transfer_characteristics2 (8bits) | It indicates opto-electronic or electro-optical conversion characteristic of video material. EOTF (inverse OETF characteristic) for display is detected. It specifies conversion characteristic of HDR. |
| number_of_bits (8bits) | Number of bits of encoded pixel |
| minimum_brightness_value (16bits) | Luminance at minimum level (cd/m2) |
| peak_level (16 bits) | Relative value at maximum level (%) |
| peak_level_brightness (16bits) | Luminance at maximum level (cd/m2) |
| compliant_threshold_level (16bits) | Threshold in display level mapping (%) |
| compliant_threshold_level_value (16bits) | Luminance that is threshold in display level mapping (cd/m2) |

FIG.6

TRANSMISSION APPARATUS, TRANSMISSION METHOD, RECEPTION APPARATUS, AND RECEPTION METHOD

CROSS REFERENCE TO RELATED APPLICATIONS

This application claims the benefit of Japanese Priority Patent Application JP 2015-257206 filed Dec. 28, 2015, the entire contents of which are incorporated herein by reference.

TECHNICAL FIELD

The present technology relates to a transmission apparatus, a transmission method, a reception apparatus, and a reception method, and more particularly to a transmission apparatus, for example, that sends transmission video data obtained by performing high dynamic range opto-electronic conversion on high dynamic range video data.

BACKGROUND ART

From the past, sending transmission video data obtained by performing high dynamic range opto-electronic conversion on high dynamic range video data has been considered. For example, NPL 1 describes, for reception by a traditional receiver, a high dynamic range opto-electronic conversion characteristic (new gamma characteristic) including an area compatible with a traditional opto-electronic conversion characteristic (gamma characteristic).

CITATION LIST

Non Patent Literature

NPL 1: Tim Borer, "Non-Linear Opto-Electrical Transfer Functions for High Dynamic Range Television", Research & Development White Paper WHP 283, July 2014

SUMMARY OF INVENTION

Technical Problem

For example, in the case of sending the above-mentioned transmission video data obtained using the high dynamic range opto-electronic conversion characteristic including the area compatible with the traditional opto-electronic conversion characteristic, it is necessary that the traditional receiver can judge that the opto-electronic conversion characteristic is the same as the traditional opto-electronic conversion characteristic and a high dynamic range-compliant receiver can judge that the opto-electronic conversion characteristic is the high dynamic range opto-electronic conversion characteristic.

The present technology has been made for enabling a high dynamic range-compliant receiver to suitably perform electro-optical conversion processing on transmission video data resulting from high dynamic range opto-electronic conversion.

Solution to Problem

According to an embodiment of present technology, there is provided a transmission apparatus including:

an opto-electronic converter configured to perform high dynamic range opto-electronic conversion on high dynamic range video data to obtain high dynamic range transmission video data; an encoder configured to receive input of at least the high dynamic range transmission video data and output a video stream including coded video data; a transmitter configured to send the video stream; and an information inserter configured to insert high dynamic range conversion characteristic meta-information into an area of a supplemental enhancement information (SEI) network abstraction layer (NAL) unit of the video stream, the high dynamic range conversion characteristic meta-information indicating a characteristic of the high dynamic range opto-electronic conversion or a characteristic of high dynamic range electro-optical conversion, which corresponds to the characteristic of the high dynamic range opto-electronic conversion.

In the embodiment of the present technology, the opto-electronic converter performs the high dynamic range opto-electronic conversion on the high dynamic range video data to obtain the high dynamic range transmission video data. For example, the characteristic of the high dynamic range opto-electronic conversion includes various characteristics such as STD-B67 (hybrid log-gamma) and ST2084 (PQ curve). The encoding section receives the input of at least the high dynamic range transmission video data and outputs the video stream including the coded video data. The transmitter sends the video stream. The information inserter inserts the high dynamic range conversion characteristic meta-information into the area of the SEI NAL unit of the video stream. The high dynamic range conversion characteristic meta-information indicates the characteristic of the high dynamic range opto-electronic conversion or the characteristic of the high dynamic range electro-optical conversion, which corresponds to the characteristic of the high dynamic range opto-electronic conversion.

As described above, in the embodiment of the present technology, the high dynamic range conversion characteristic meta-information is inserted into the area of the SEI NAL unit of the video stream. Thus, a high dynamic range-compliant receiver can suitably perform electro-optical conversion processing on the high dynamic range transmission video data on the basis of the high dynamic range conversion characteristic meta-information.

Note that, in the embodiment of the present technology, for example, the encoder may be further configured to receive input of standard dynamic range transmission video data obtained by performing standard dynamic range opto-electronic conversion on standard dynamic range video data, together with the high dynamic range transmission video data, and output a basic video stream including coded video data of the standard dynamic range transmission video data and an extended video stream including coded video data of a difference between the high dynamic range transmission video data and the standard dynamic range transmission video data. The information inserter may be further configured to insert the high dynamic range conversion characteristic meta-information into an area of an SEI NAL unit of the extended video stream, and insert standard dynamic range conversion characteristic meta-information into an area of a sequence parameter set (SPS) NAL unit of the basic video stream, the standard dynamic range conversion characteristic meta-information indicating a characteristic of the standard dynamic range opto-electronic conversion. The term "extended" is used herein to also refer to "enhancement".

In this case, the high dynamic range-compliant receiver can obtain the high dynamic range transmission video data from the basic video stream and the extended video stream. Then, the high dynamic range-compliant receiver can suitably perform electro-optical conversion processing on the high dynamic range transmission video data on the basis of the high dynamic range conversion characteristic meta-information inserted into the area of the SEI NAL unit of the extended video stream to obtain the video data for display. Further, the standard dynamic range-compliant receiver can obtain the standard dynamic range transmission video data from the basic video stream. Then, the standard dynamic range-compliant receiver can suitably perform electro-optical conversion processing on the standard dynamic range transmission video data on the basis of the standard dynamic range conversion characteristic meta-information inserted into the area of the SPS NAL unit of the basic video stream to obtain the video data for display.

Further, in the embodiment of the present technology, for example, the information inserter may be further configured to insert meta-information for display control into the area of the SEI NAL unit together with the high dynamic range conversion characteristic meta-information. In this case, for example, the meta-information for display control may include peak luminance information. Further, for example, the meta-information for display control further may include area information indicating an area in which luminance conversion is allowed. In this case, the high dynamic range-compliant receiver can suitably control a display luminance using the meta-information for display control.

Further, according to another embodiment of the present technology, there is provided a reception apparatus, including:

a receiver configured to receive a video stream; a decoder configured to decode the video stream to obtain high dynamic range transmission video data, the video stream including an area of an SEI NAL unit, into which high dynamic range conversion characteristic meta-information is inserted, the high dynamic range conversion characteristic meta-information indicating a characteristic of high dynamic range opto-electronic conversion or a characteristic of high dynamic range electro-optical conversion, which corresponds to the characteristic of the high dynamic range opto-electronic conversion; and an electro-optical converter configured to perform high dynamic range electro-optical conversion on the high dynamic range transmission video data on the basis of the meta-information indicating the high dynamic range conversion characteristic to obtain video data for display.

In the embodiment of the present technology, the receiver receives the video stream. The decoding section decodes the video stream to obtain the high dynamic range transmission video data. The high dynamic range conversion characteristic meta-information is inserted into the area of the SEI NAL unit of the video stream. The high dynamic range conversion characteristic meta-information indicates the characteristic of the high dynamic range opto-electronic conversion or the characteristic of the high dynamic range electro-optical conversion, which corresponds to the characteristic of the high dynamic range opto-electronic conversion. The electro-optical converter performs high dynamic range electro-optical conversion on the high dynamic range transmission video data on the basis of the high dynamic range conversion characteristic meta-information to obtain the video data for display.

For example, the receiver may be further configured to receive a basic (the terms "basic" and "base" are used interchangeably herein) video stream including coded video data of the standard dynamic range transmission video data and an extended video stream including coded video data of a difference between the high dynamic range transmission video data and the standard dynamic range transmission video data. The decoder may be further configured to decode the basic video stream to obtain the standard dynamic range transmission video data, and decode the extended video stream using the standard dynamic range transmission video data to obtain the high dynamic range transmission video data. The high dynamic range conversion characteristic meta-information may be inserted into an area of an SEI NAL unit of the extended video stream.

As described above, in the embodiment of the present technology, the electro-optical conversion is performed on the high dynamic range transmission video data to obtain the video data for display on the basis of the high dynamic range conversion characteristic meta-information inserted into the area of the SEI NAL unit of the video stream. Thus, it is possible to suitably perform electro-optical conversion on the high dynamic range transmission video data to obtain favorable high dynamic range video data as the video data for display.

Note that, in the embodiment of the present technology, for example, peak luminance information may be further inserted into the area of the SEI NAL unit. The reception apparatus may further include a luminance adjuster configured to adjust a display luminance of the video data for display on the basis of the peak luminance information. Such adjustment of the display luminance based on the peak luminance information makes it possible to suitably adjust the display luminance according to the display-luminance capability of a monitor.

Further, in this case, for example, area information indicating an area in which luminance conversion is allowed may be further inserted into the area of the SEI NAL unit, and the luminance adjuster may be further configured to adjust the display luminance in the area in which luminance conversion is allowed, on the basis of the area information indicating the area in which luminance conversion is allowed. Such adjustment of the display luminance in the area in which luminance conversion is allowed makes it possible to favorably reproduce video having a luminance intended by a producer.

Advantageous Effects of Invention

In accordance with the embodiments of the present technology, electro-optical conversion processing on transmission video data resulting from high dynamic range opto-electronic conversion can be suitably performed by a high dynamic range-compliant receiver. It should be noted that effects described herein are merely examples and are not limitative and additional effects may be provided.

BRIEF DESCRIPTION OF DRAWINGS

FIG. 5 is a diagram showing a structure example of a dynamic range SEI message.

FIG. 6 is a diagram showing the contents of main information in the structure example of the dynamic range SEI message.

DESCRIPTION OF EMBODIMENTS

Figure 1:
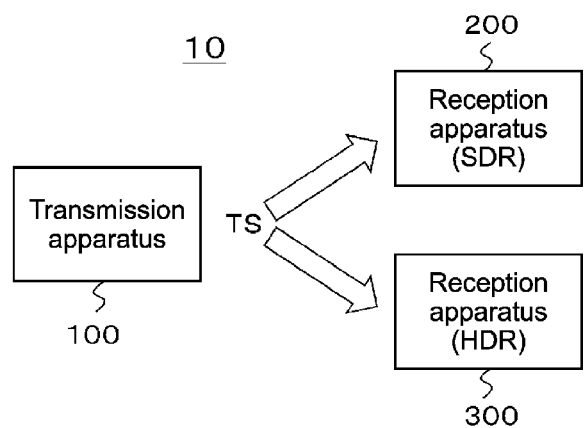
FIG. 1 is a block diagram showing a configuration example of a transmission and reception system according to an embodiment.

Hereinafter, an embodiment will be described. Note that descriptions thereof will be made in the following order.
1. Embodiment
2. Modified Example 1. Embodiment Configuration Example of Transmission and Reception System FIG. 1 shows a configuration example of a transmission and reception system 10 according to the embodiment. The transmission and reception system 10 is constituted of a transmission apparatus 100 and reception apparatuses 200, 300. The reception apparatus 200 is a reception apparatus compliant with a traditional standard dynamic range (SDR) and incompliant with a high dynamic range (HDR). The reception apparatus 300 is an HDR-compliant reception apparatus.

The transmission apparatus 100 sends an MPEG-2 transport stream (hereinafter, simply referred to as "transport stream TS") through broadcasting waves or network packets. The transport stream TS is a container stream (multiplexed stream). The transport stream TS includes video streams such as HEVC and AVC video streams, in this embodiment, two video streams, i.e., a basic video stream and an extended video stream.

The basic video stream includes coded video data obtained by subjecting SDR transmission video data to predictive coding. The SDR transmission video data is obtained by performing SDR opto-electronic conversion on SDR video data. The extended video stream includes coded video data obtained by subjecting HDR transmission video data to predictive coding using the SDR transmission video data. The HDR transmission video data is obtained by performing HDR opto-electronic conversion on HDR video data.

HDR conversion characteristic meta-information is inserted into the video stream, in this embodiment, an area of an SEI NAL unit of the extended video stream. The HDR conversion characteristic meta-information indicates a characteristic (e.g., STD-B67, ST2084) of the HDR opto-electronic conversion or a characteristic of HDR electro-optical conversion, which corresponds to the characteristic of the HDR opto-electronic conversion. Then, SDR conversion characteristic meta-information is inserted into the video stream, in this embodiment, an area of an SPS NAL unit of the basic video stream. The SDR conversion characteristic meta-information indicates a characteristic (BT.709: gamma characteristic) of the SDR opto-electronic conversion.

Further, meta-information for display control is inserted into the video stream, in this embodiment, the area of the SEI NAL unit of the extended video stream together with the HDR conversion characteristic meta-information. The meta-information for display control includes peak luminance information, area information indicating an area in which luminance conversion is allowed, and the like.

The reception apparatus 200 receives the transport stream TS sent from the transmission apparatus 100 through broadcasting waves or network packets. The transport stream TS includes the video streams, in this embodiment, the two video streams, i.e., the basic video stream and the extended video stream as described above. Then, the SDR conversion characteristic meta-information is inserted into the received video stream, in this embodiment, the area of the SPS NAL unit of the basic video stream.

The reception apparatus 200 extracts, from the transport stream TS, a necessary video stream, here, the basic video stream and decodes the extracted stream to obtain SDR transmission video data. The reception apparatus 200 suitably performs electro-optical conversion processing on the SDR transmission video data on the basis of the SDR conversion characteristic meta-information to obtain SDR video data that is video data for display. Further, the reception apparatus 200 performs display mapping, i.e., adjustment of a display luminance on the video data for display on the basis of a peak luminance (100 cd/m$^2$), the maximum display luminance of a monitor, or the like.

The reception apparatus 300 receives the transport stream TS sent from the transmission apparatus 100 through broadcasting waves or network packets. The transport stream TS includes the video streams, in this embodiment, the two video streams, i.e., the basic video stream and the extended video stream as described above. Then, the HDR conversion characteristic meta-information is inserted into the received video stream, in this embodiment, the area of the SEI NAL unit of the extended video stream.

The reception apparatus 300 extracts, from the transport stream TS, a necessary video stream, here, both of the basic video stream and the extended video stream and decodes the extracted streams to obtain HDR transmission video data. The reception apparatus 300 suitably performs electro-optical conversion processing on the HDR transmission video data on the basis of the HDR conversion characteristic meta-information to obtain HDR video data that is video data for display. Further, the reception apparatus 300 performs display mapping, i.e., adjustment of the display luminance on the video data for display on the basis of the meta-information for display control, the maximum display luminance of a monitor, or the like, which is inserted together with the HDR conversion characteristic meta-information.

Figure 2:
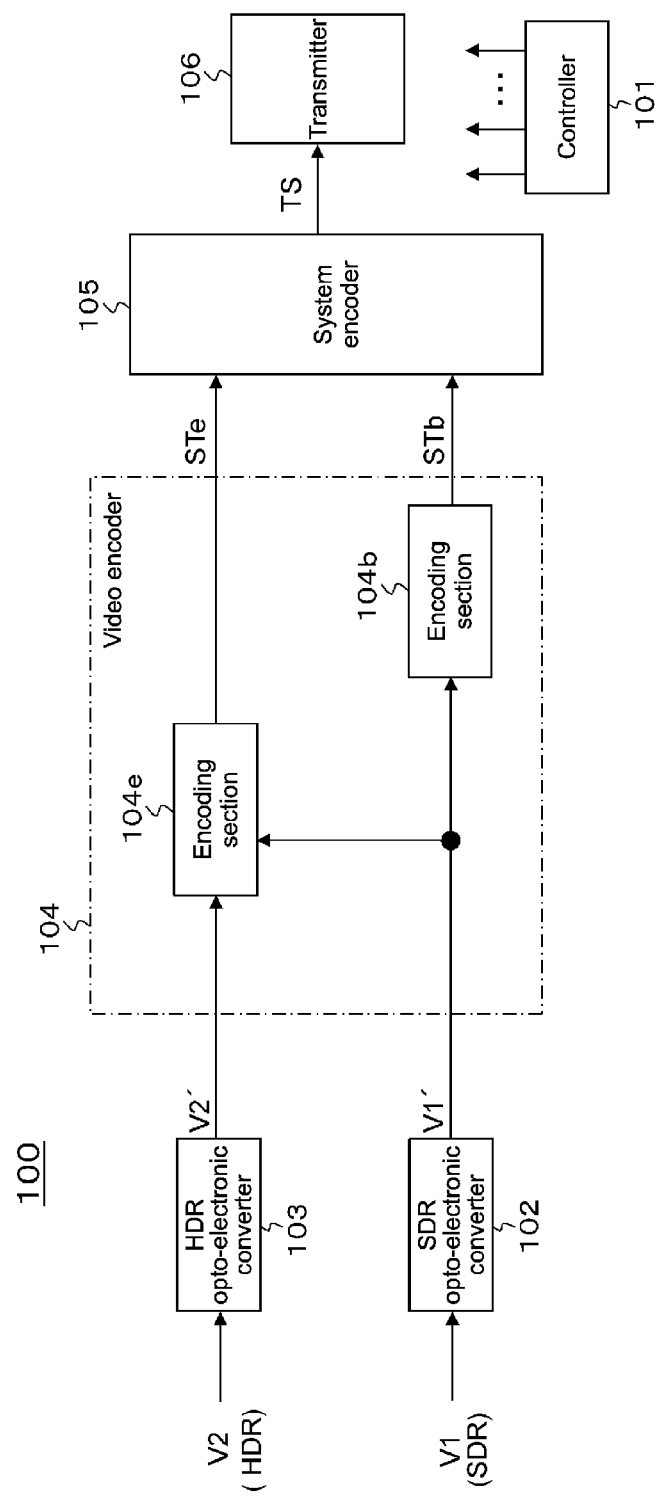
FIG. 2 is a block diagram showing a configuration example of a transmission apparatus constituting the transmission and reception system.

Configuration Example of Transmission Apparatus FIG. 2 shows a configuration example of the transmission apparatus 100. The transmission apparatus 100 handles SDR video data V1 and HDR video data V2. Provided that the white peak luminance of a traditional SDR image is 100%, the HDR video data V2 has a luminance ranging from 0 to 100%*N, for example, 0 to 1000% or more.

Figure 3:
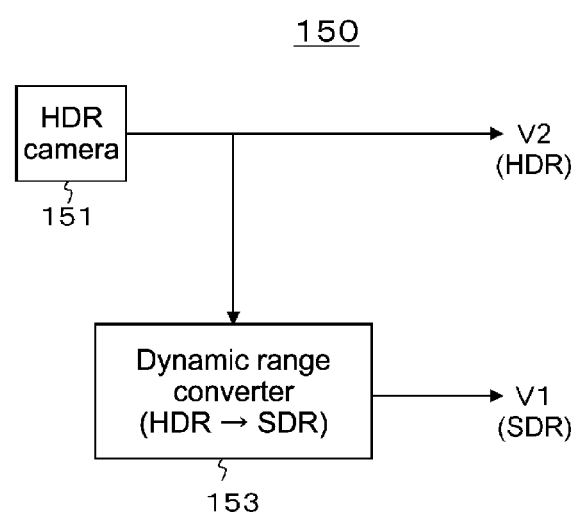
FIG. 3 is a block diagram showing a configuration example of a video data generator that generates SDR video data V1 and HDR video data V2.

FIG. 3 shows a configuration example of a video data generator 150 that generates the SDR video data V1 and the HDR video data V2. The video data generator 150 includes a HDR camera 151 and a dynamic range converter 153. The HDR camera 151 images a subject and outputs the HDR video data V2. The dynamic range converter 153 converts the HDR video data V2, which is output from the HDR camera 151, from the HDR to the SDR. Then, dynamic range converter 153 outputs the SDR video data V1.

Referring back to FIG. 2, the transmission apparatus 100 includes a controller 101, an SDR opto-electronic converter 102, an HDR opto-electronic converter 103, a video encoder 104, a system encoder 105, and a transmitter 106. The controller 101 includes a central processing unit (CPU) and controls operations of the respective sections of the transmission apparatus 100 according to a control program.

The SDR opto-electronic converter 102 applies the SDR opto-electronic conversion characteristic (BT.709: gamma characteristic) to the SDR video data V1 to obtain SDR video data for transmission, i.e., SDR transmission video data V1'. The HDR opto-electronic converter 103 applies the HDR opto-electronic conversion characteristic (e.g., STD-B67, ST2084) to the HDR video data V2 to obtain HDR video data for transmission, i.e., HDR transmission video data V2'.

Figure 4:
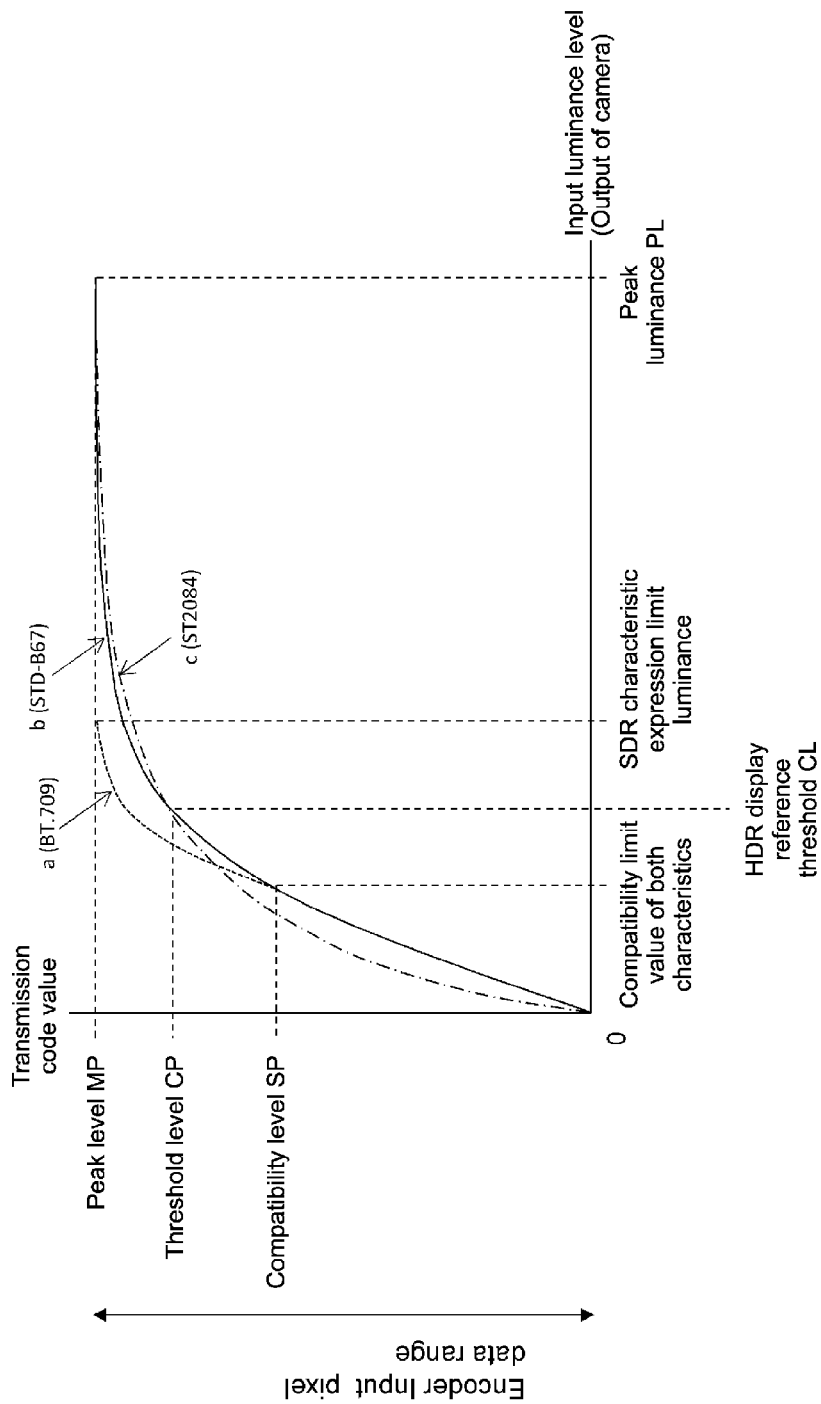
FIG. 4 is a diagram showing an example of opto-electronic conversion characteristics of SDR and HDR.

FIG. 4 shows an example of opto-electronic conversion characteristics of the SDR and the HDR. In this figure, the horizontal axis indicates an input luminance level and the vertical axis indicates a transmission code value. The broken line "a" indicates an SDR opto-electronic conversion characteristic (BT.709: gamma characteristic). The solid line "b" indicates an STD-B67 (HLG) characteristic, which is the characteristic of the HDR opto-electronic conversion. The long dashed short dashed line "c" indicates an ST2084 (PQ curve) characteristic, which is the characteristic of the HDR opto-electronic conversion.

The STD-B67 (HLG) characteristic includes an area compatible with an SDR opto-electronic conversion characteristic (BT.709: gamma characteristic). That is, the curves of the both characteristics match until the input luminance level reaches a compatibility limit value of the both characteristics. When the input luminance level is the compatibility limit value, the transmission code value is a compatibility level SP. The ST2084 (PQ curve) is a curve of a quantization step adapted for human eyes. In the HDR opto-electronic conversion characteristic, when the input luminance level is a peak luminance PL, the transmission code value is a peak level MP.

An HDR display reference threshold CL indicates a boundary between an area the luminance of which is to be matched with a luminance displayed on a monitor (CE monitor) in the receiver and an area depending on the CE monitor. When the input luminance level is a compatibility limit value CL, the transmission code value is a threshold level CP. Note that, in the SDR opto-electronic conversion characteristic, when the input luminance level is an SDR characteristic expression limit luminance SL, the transmission code value is the peak level MP. Here, SL is 100 cd/m².

Referring back to FIG. 2, the video encoder 104 includes an encoding section 104b and an encoding section 104e. The encoding section 104b performs predictive coding such as H.264/AVC and H.265/HEVC on the SDR transmission video data V1' to obtain coded video data. In this case, the encoding section 104b predicts the SDR transmission video data V1'. Further, the encoding section 104b generates, by the use of a stream formatter (not shown) at the subsequent stage, a video stream, i.e., a basic video stream STb including that coded video data.

At this time, the encoding section 104b inserts the SDR conversion characteristic meta-information indicating the characteristic of the SDR opto-electronic conversion, into a layer of the basic video stream STb. That is, the encoding section 104b inserts SDR conversion characteristic meta-information "Transfer characteristics 1" indicating the SDR opto-electronic conversion characteristic (BT.709: gamma characteristic), into an area of video usability information (VUI) of an SPS NAL unit of an access unit (AU).

The encoding section 104e performs predictive coding such H.264/AVC and H.265/HEVC on the HDR transmission video data V2' to obtain coded video data. In this case, in order to reduce a prediction residual, the encoding section 104e selectively predicts the HDR transmission video data V2' or the SDR transmission video data V1' for each coding block. Further, the encoding section 104e generates, by the use of a stream formatter (not shown) at the subsequent stage, a video stream, i.e., an extended video stream STe including that coded video data.

At this time, the encoding section 104e inserts HDR conversion characteristic meta-information indicating a characteristic of HDR opto-electronic conversion (e.g., STD-B67, ST2084) or a characteristic of HDR electro-optical conversion, which corresponds to the characteristic of the HDR opto-electronic conversion, and the meta-information for display control, into a layer of the extended video stream STe. That is, the encoding section 104e inserts a newly defined dynamic range SEI message including the HDR conversion characteristic meta-information "transfer_characteristics2" and the meta-information for display control, into a portion "Suffix_SEIs" of the access unit (AU), for example.

FIG. 5 shows a structure example (Syntax) of a dynamic range SEI message. FIG. 6 shows the contents (Semantics) of main information in the structure example. An eight-bit field of "transfer_characteristics2" indicates a characteristic of HDR opto-electronic conversion or a characteristic of HDR electro-optical conversion, which corresponds to the characteristic of the HDR opto-electronic conversion. If the meta-information "transfer_characteristics2" is present, the HDR-compliant reception apparatus 300 refers to the meta-information "transfer_characteristics2" preferentially rather than the meta-information "Transfer characteristics 1" inserted into the area of the VUI when displaying.

An eight-bit field of "number_of_bits" indicates the number of bits of an encoded pixel. A sixteen-bit field of "minimum_brightness_value" indicates a luminance (cd/m²) at a minimum level. A sixteen-bit field of "peak_level" indicates a relative value (%) at a maximum level. A sixteen-bit field of "peak_level_brightness" indicates a luminance (cd/m²) at a maximum level and corresponds to the peak luminance PL in FIG. 4. "Peak_level" of "peak_level_brightness" enables selection of an image processing method used in forming a display image suitable for display capability after a histogram of the image is determined, for example, to be performed.

A sixteen-bit field of "compliant_threshold_level" indicates a threshold (%) in display level mapping. A sixteen-bit field of "compliant_threshold_level_value" indicates a luminance (cd/m²) that is the threshold in the display level mapping, and corresponds to the HDR display reference threshold CL in FIG. 4.

Referring back to FIG. 2, the system encoder 105 generates the transport stream TS including the basic video stream STb and the extended video stream STe, which are generated by the video encoder 104. The transmitter 106 sends the transport stream TS to the reception apparatuses 200, 300 through broadcasting waves or network packets.

An operation of the transmission apparatus 100 shown in FIG. 2 will be briefly described. The SDR video data V1 is supplied to the SDR opto-electronic converter 102. The SDR opto-electronic converter 102 applies the SDR opto-electronic conversion characteristic (BT.709: gamma characteristic) to the SDR video data V1 to obtain the SDR transmission video data V1' that is the SDR video data for transmission.

Further, the HDR video data V2 is supplied to the HDR opto-electronic converter 103. The HDR opto-electronic converter 103 applies the HDR opto-electronic conversion characteristic (e.g., STD-B67, ST2084) to the HDR video data V2 to obtain the HDR transmission video data V2' that is the HDR video data for transmission.

The SDR transmission video data V1' obtained by the SDR opto-electronic converter 102 is supplied to the encoding section 104b and the encoding section 104e of the encoder 104. The encoding section 104b performs predictive coding such H.264/AVC and H.265/HEVC on the SDR transmission video data V1' to obtain the coded video data. The basic video stream STb that is a video stream including that coded video data is generated.

At this time, the encoding section 104b inserts the SDR conversion characteristic meta-information indicating the characteristic of the SDR opto-electronic conversion, into the layer of the basic video stream STb. In this case, the SDR conversion characteristic meta-information "Transfer characteristics 1" including the SDR opto-electronic conversion characteristic (BT.709: gamma characteristic) is inserted into the area of the VUI of the SPS NAL unit of the access unit (AU).

The HDR transmission video data V2' obtained by the HDR opto-electronic converter 103 is supplied to the encoding section 104e of the encoder 104. Using the SDR transmission video data V1' with respect to the HDR transmission video data V2', the encoding section 104e performs predictive coding such as H.264/AVC and H.265/HEVC to obtain the coded video data. The extended video stream STe that is a video stream including that coded video data is generated.

At this time, the encoding section 104e inserts HDR conversion characteristic meta-information indicating a HDR opto-electronic conversion characteristic (e.g., STD-B67, ST2084) or a characteristic of HDR electro-optical conversion, which corresponds to the characteristic of the HDR opto-electronic conversion, and the meta-information for display control, into the layer of the extended video stream STe. In this case, the dynamic range SEI message including the HDR conversion characteristic meta-information "transfer_characteristics2" and the meta-information for display control is inserted into the portion "Suffix_SEIs" of the access unit (AU), for example.

The basic video stream STb generated by the encoding section 104b of the video encoder 104 is supplied to the system encoder 105. Further, the extended video stream STe generated by the encoding section 104e of the video encoder 104 is supplied to the system encoder 105.

The system encoder 105 PES-packetizes, transport packetizes, and multiplexes each of the basic video stream STb and the extended video stream STe to obtain the transport stream TS that is the container stream (multiplexed stream). The transport stream TS is sent to the reception apparatuses 200, 300 by the transmitter 106 through broadcasting waves or network packets.

Configuration of Transport Stream TS

Figure 7:
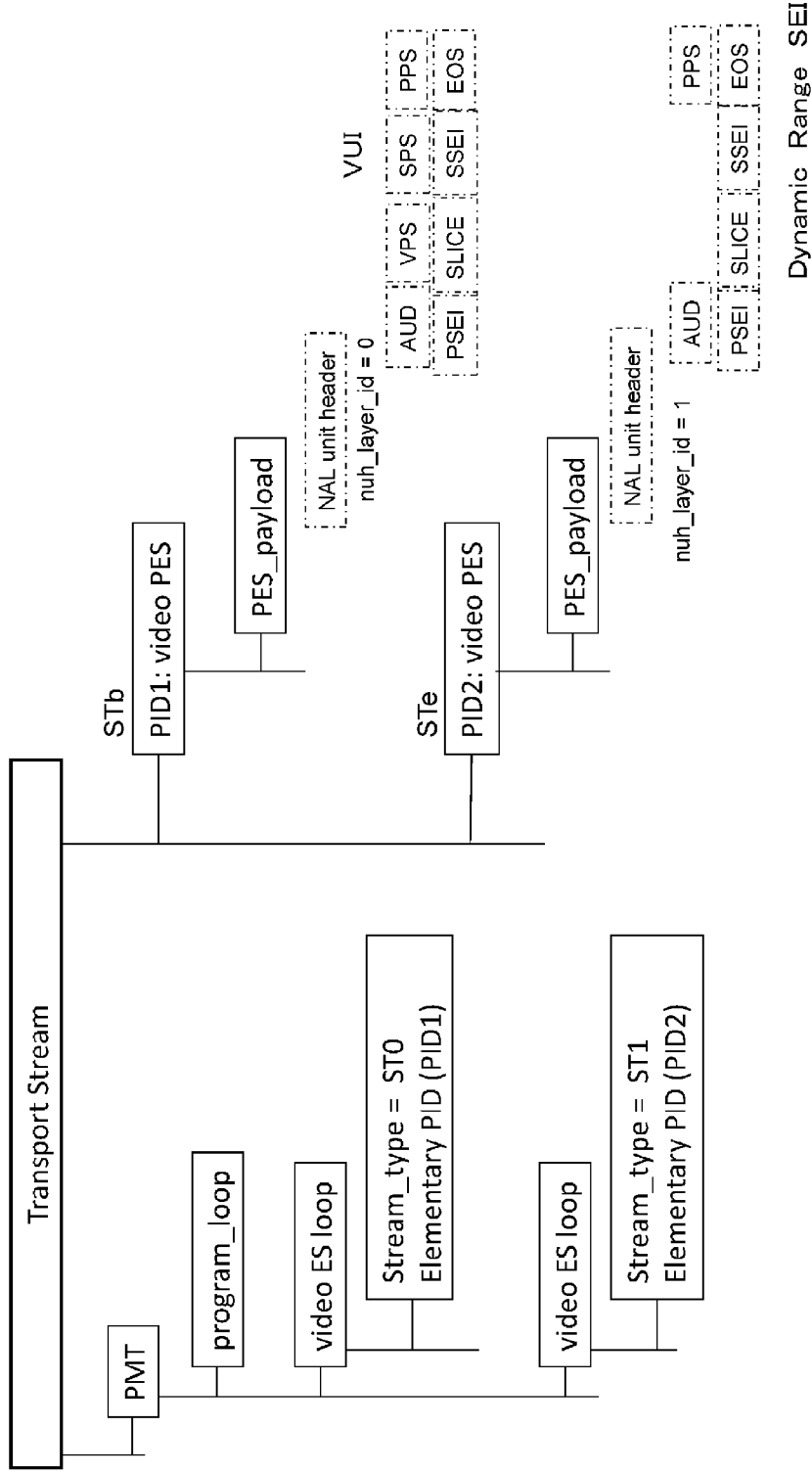
FIG. 7 is a diagram showing a configuration example of a transport stream TS.

FIG. 7 shows a configuration example of the transport stream TS. The transport stream TS includes the two video streams, i.e., the basic video stream STb and the extended video stream STe. In this configuration example, a PES packet "video PES" of each video stream is present.

A packet identifier (PID) of the basic video stream STb is, for example, PID1. The basic video stream STb includes coded video data obtained by subjecting the SDR transmission video data V1' to predictive coding. In each access unit of the basic video stream, an NAL unit such as STb, AUD, VPS, SPS, PPS, PSEI, SLICE, SSEI, and EOS is present.

"Nuh_layer_id" in the header of each NAL unit is, for example, "0", which indicates that it is the basic video stream STb according to the coded video data. Further, the SDR conversion characteristic meta-information "Transfer characteristics 1" indicating the characteristic (BT.709: gamma characteristic) of the SDR opto-electronic conversion is inserted into the area of the VUI of the NAL unit that is the SPS.

Further, the packet identifier (PID) of the extended video stream STe is, for example, PID2. The extended video stream STe includes coded video data obtained by subjecting the HDR transmission video data V2' to predictive coding using the SDR transmission video data V1'. In each access unit of this extended video stream STe, an NAL unit such as AUD, PPS, PSEI, SLICE, SSEI, and EOS is present.

"Nuh_layer_id" in the header of each NAL unit is, for example, "1", which indicates that it is the extended video stream STe according to the coded video data. The dynamic range SEI message in which the HDR conversion characteristic meta-information "Transfer characteristics 2" and the meta-information for display control are described is inserted into the access unit.

Further, the transport stream TS includes a program map table (PMT) as program specific information (PSI). The PSI is information describing which program each elementary stream of the transport stream belongs to.

A program loop describing information related to the entire program is present in the PMT. Further, an elementary stream loop including information related to each elementary stream is present in the PMT. In this configuration example, two video elementary stream loops (video ES loops) are present corresponding to the two video streams, i.e., the basic video stream STb and the extended video stream STe.

Information on the stream type (ST0), the packet identifier (PID1), and the like is provided in the video elementary stream loop corresponding to the basic video stream STb. Further, information on the stream type (ST1), the packet identifier (PID2), and the like is provided in the video elementary stream loop corresponding to the extended video stream STe.

Configuration Example of SDR-Compliant Reception Apparatus

Figure 8:
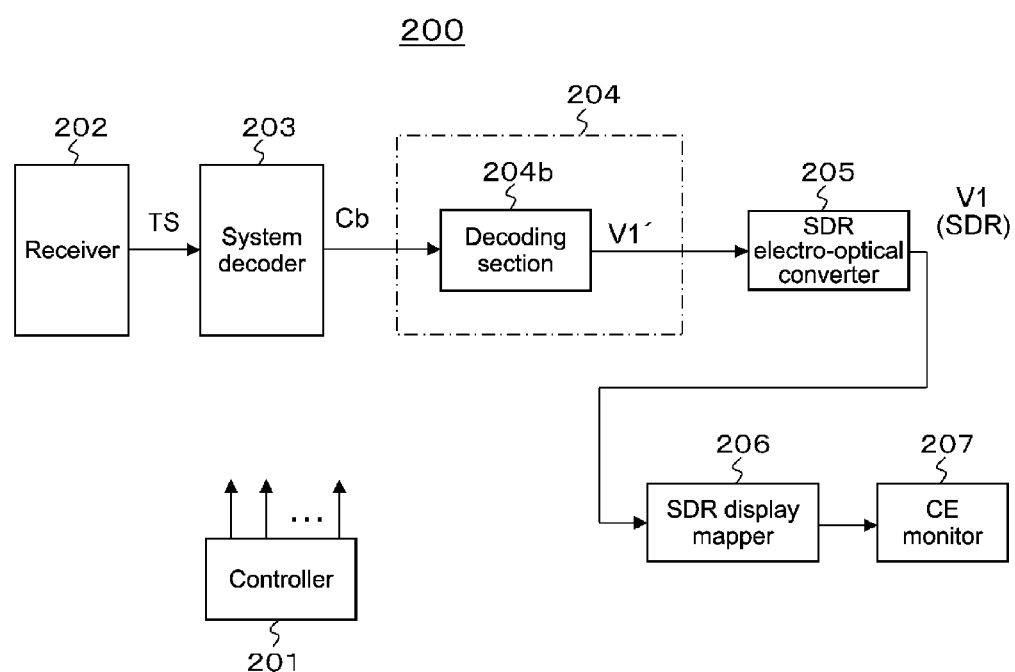
FIG. 8 is a block diagram showing a configuration example of a traditional reception apparatus compliant with the SDR (incompliant with the HDR), which constitutes the transmission and reception system.

FIG. 8 shows a configuration example of the reception apparatus 200. The reception apparatus 200 is an SDR-compliant reception apparatus as described above. The reception apparatus 200 includes a controller 201, a receiver 202, a system decoder 203, a video decoder 204, an SDR electro-optical converter 205, an SDR display mapper 206, and a CE monitor 207. The controller 201 includes a central processing unit (CPU) and controls operations of the respective sections of the reception apparatus 200 according to a control program.

The receiver 202 receives the transport stream TS sent from the transmission apparatus 100 through broadcasting waves or network packets. The transport stream TS includes two video streams, i.e., the basic video stream STb and the extended video stream STe.

The basic video stream STb includes coded video data obtained by subjecting the SDR transmission video data to predictive coding. The SDR transmission video data is obtained by performing SDR opto-electronic conversion on the SDR video data. The extended video stream STe includes coded video data obtained by subjecting HDR transmission video data to predictive coding using the SDR transmission video data. The HDR transmission video data is obtained by performing HDR opto-electronic conversion on the HDR video data.

The SDR conversion characteristic meta-information indicating the characteristic of the SDR opto-electronic conversion is inserted into the area of the SPS NAL unit of the basic video stream. Further, the HDR conversion characteristic meta-information indicating the characteristic of the HDR opto-electronic conversion or the characteristic of HDR electro-optical conversion, which corresponds to the characteristic of the HDR opto-electronic conversion, is inserted into the area of the SEI NAL unit of the extended video stream.

The system decoder 203 extracts the basic video stream STb from the transport stream TS. The video decoder 204 includes a decoding section 204b. The decoding section 204b decodes the basic video stream STb, which is extracted by the system decoder 203, to obtain the SDR transmission video data V1'. In this case, the decoding section 204b performs processing inverse to that of the encoding section 104b of the video encoder 104 of FIG. 2.

Further, the decoding section 204b extracts a parameter set and an SEI message, which are inserted into each access unit of the basic video stream STb, and sends the parameter set and the SEI message to the controller 201. The controller 201 recognizes the SDR opto-electronic conversion characteristic (BT.709: gamma characteristic) on the basis of the SDR conversion characteristic meta-information "Transfer characteristics 1" in the video usability information (VUI) of the SPS. The controller 201 sets an SDR electro-optical conversion characteristic that is a characteristic inverse to the SDR opto-electronic conversion characteristic, in the SDR electro-optical converter 205.

The SDR electro-optical converter 205 applies the SDR electro-optical conversion characteristic to the transmission video data V1', which is output from the video decoder 204, to obtain the SDR video data V1. The SDR display mapper 206 adjusts the display luminance of the SDR video data V1 obtained by the SDR electro-optical converter 205. That is, if a luminance corresponding to the maximum luminance display capability of the CE monitor 207 is higher than the SDR characteristic expression limit luminance SL (see FIG. 4), the SDR display mapper 206 performs display mapping, i.e., luminance conversion such that a maximum display luminance level is equal to a luminance level corresponding to the maximum luminance display capability of the CE monitor 207.

An operation of the reception apparatus 200 shown in FIG. 8 will be briefly described. The receiver 202 receives a transport stream TS sent from the transmission apparatus 100 through broadcasting waves or network packets. The transport stream TS is supplied to the system decoder 203. The system decoder 203 extracts a basic video stream STb from the transport stream TS.

The basic video stream STb extracted by the system decoder 203 is supplied to the decoding section 204b of the video decoder 204. The decoding section 204b decodes the basic video stream STb to obtain the SDR transmission video data V1'. Further, the decoding section 204b extracts a parameter set and an SEI message, which are inserted into the basic video stream STb, and sends the parameter set and the SEI message to the controller 201.

The controller 201 recognizes the SDR opto-electronic conversion characteristic (BT.709: gamma characteristic) on the basis of the SDR conversion characteristic meta-information "Transfer characteristics 1" in the video usability information (VUI) of the SPS. Then, the SDR electro-optical conversion characteristic that is a characteristic inverse to the SDR opto-electronic conversion characteristic is set in the SDR electro-optical converter 205 under the control of the controller 201.

The SDR transmission video data V1' obtained by the video decoder 204 (decoding section 204b) is supplied to the SDR electro-optical converter 205. The SDR electro-optical converter 205 applies the SDR electro-optical conversion characteristic to the SDR transmission video data V1' to obtain the SDR video data V1 that is video data for display.

The SDR video data V1 obtained by the SDR electro-optical converter 205 is supplied to the SDR display mapper 206. The SDR display mapper 206 adjusts the display luminance of the SDR video data V1. That is, if the luminance corresponding to the maximum luminance display capability of the CE monitor 207 is higher than the SDR characteristic expression limit luminance SL, the SDR display mapper 206 performs display mapping, i.e., luminance conversion such that the maximum display luminance level is equal to the luminance level corresponding to the maximum luminance display capability of the CE monitor 207.

The output video data of the SDR display mapper 206 is supplied to the CE monitor 207. The SDR image is displayed on the CE monitor 207, using the SDR video data the display luminance of which has been adjusted.

Configuration Example of HDR-Compliant Reception Apparatus

Figure 9:
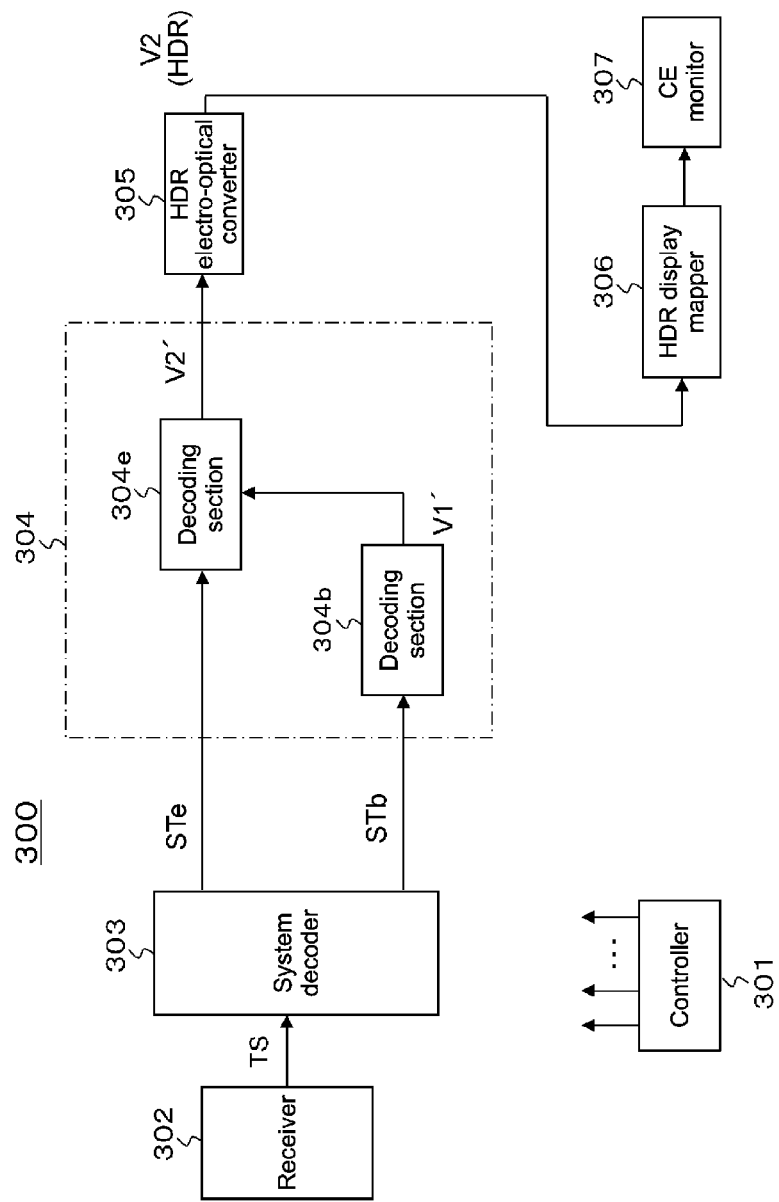
FIG. 9 is a block diagram showing a configuration example of an HDR-compliant reception apparatus, which constitutes the transmission and reception system.

FIG. 9 shows a configuration example of the reception apparatus 300. The reception apparatus 300 is an HDR-compliant reception apparatus as described above. The reception apparatus 300 includes a controller 301, a receiver 302, a system decoder 303, a video decoder 304, an HDR electro-optical converter 305, an HDR display mapper 306, and a CE monitor 307. The controller 301 includes a central processing unit (CPU) and controls operations of the respective sections of the reception apparatus 300 according to a control program.

The receiver 302 receives the transport stream TS sent from the transmission apparatus 100 through broadcasting waves or network packets. The transport stream TS includes two video streams, i.e., the basic video stream STb and the extended video stream STe.

The basic video stream STb includes coded video data obtained by subjecting the SDR transmission video data to predictive coding. The SDR transmission video data is obtained by performing the SDR opto-electronic conversion on the SDR video data. The extended video stream STe includes coded video data obtained by subjecting HDR transmission video data to predictive coding using the SDR transmission video data. The HDR transmission video data is obtained by performing HDR opto-electronic conversion on the HDR video data.

The SDR conversion characteristic meta-information indicating the characteristic of the SDR opto-electronic conversion is inserted into the area of the SPS NAL unit of the basic video stream. Further, the HDR conversion characteristic meta-information indicating the characteristic of the HDR opto-electronic conversion or the characteristic of HDR electro-optical conversion, which corresponds to the characteristic of the HDR opto-electronic conversion, is inserted into the area of the SEI NAL unit of the extended video stream.

The system decoder 303 extracts the basic video stream STb and the extended video stream STe from the transport stream TS. The video decoder 304 includes decoding sections 304b, 304e. The decoding section 304b decodes the basic video stream STb, which is extracted by the system decoder 303, to obtain the SDR transmission video data V1'. In this case, the decoding section 304b performs processing inverse to that of the encoding section 104b of the video encoder 104 of FIG. 2. Further, the decoding section 304b extracts the parameter set and the SEI message, which are inserted into each access unit of the basic video stream STb, and sends the parameter set and the SEI message to the controller 301.

Using the SDR transmission video data V1', the decoding section 304e decodes the extended video stream STe, which is extracted by the system decoder 303, to obtain the HDR transmission video data V2'. In this case, the decoding section 304e performs processing inverse to that of the encoding section 104e of the video encoder 104 of FIG. 2. Further, the decoding section 304e extracts the parameter set and the SEI message, which are inserted into each access unit of the extended video stream STe, and sends the parameter set and the SEI message to the controller 301.

The controller 301 recognizes the HDR opto-electronic conversion characteristic (e.g., STD-B67, ST2084) on the basis of the HDR conversion characteristic meta-information "Transfer characteristics 2" in the dynamic range SEI message. The controller 301 sets an HDR electro-optical conversion characteristic that is a characteristic inverse to the HDR opto-electronic conversion characteristic, in the HDR electro-optical converter 305. The HDR electro-optical converter 305 applies the HDR electro-optical conversion characteristic to the HDR transmission video data V2', which is output from the video decoder 304 (decoding section 304e), to obtain the HDR video data V2 that is video data for display.

The HDR display mapper 306 adjusts the display luminance of the HDR video data V2 obtained by the HDR electro-optical converter 305 on the basis of the meta-information for display control in the dynamic range SEI message under the control of the controller 301. Such adjustment of the display luminance will be described.

Figure 10:
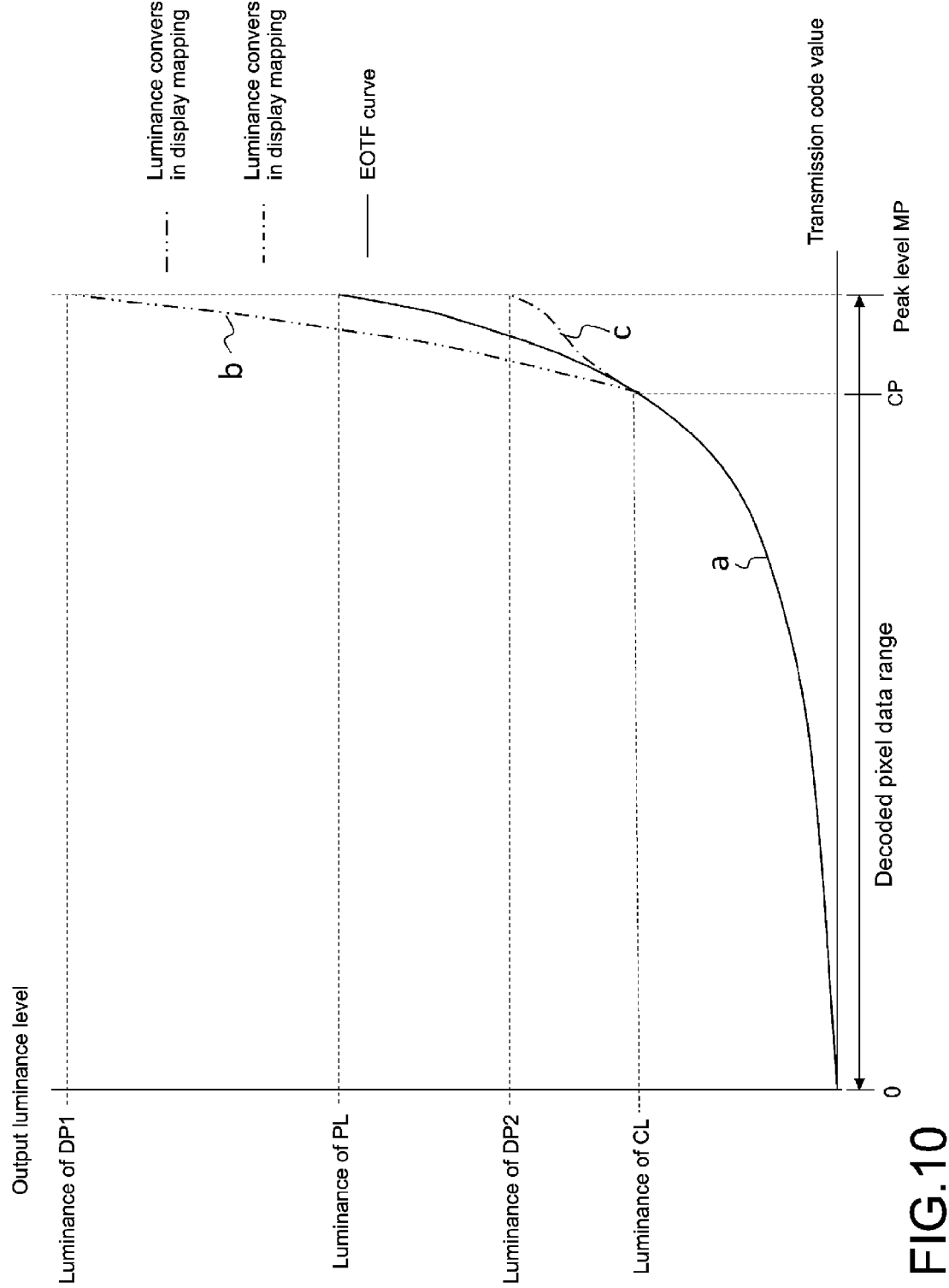
FIG. 10 is a diagram showing an example of adjustment of a display luminance in an HDR display mapper.

FIG. 10 shows an example of the adjustment of the display luminance. In this figure, the horizontal axis indicates a transmission code value, which corresponds to the vertical axis of FIG. 4. The vertical axis indicates an output luminance level (display luminance level), which corresponds to the horizontal axis of FIG. 4. In this figure, the solid line "a" is an EOTF curve indicating the HDR electro-optical conversion characteristic. When the transmission code value is a peak level MP, the output luminance level is PL. Further, when the transmission code value is a threshold level CP, the output luminance level is CL.

Here, if the luminance corresponding to the maximum luminance display capability of the CE monitor 307 is higher than a maximum luminance PL assumed by a master monitor in the transmitter, the output luminance level corresponding to a value that is the transmission code value larger than the threshold level CP is assigned to a range up to a maximum display luminance level DP1 of the CE monitor 307 by processing in the HDR display mapper 306 (processing of increasing the luminance). In this figure, the long dashed double-short dashed line "b" shows an example of the luminance conversion in this case.

On the other hand, if the luminance corresponding to the maximum luminance display capability of the CE monitor 307 is lower than the maximum luminance PL assumed by the master monitor in the transmitter, the output luminance level corresponding to the value that is the transmission code value larger than the threshold level CP is assigned to a range up to a maximum display luminance level DP2 of the CE monitor 307 by processing in the HDR display mapper 306 (processing of decreasing the luminance). In this figure, the long dashed short dashed line "c" shows an example of the luminance conversion in this case.

An operation of the reception apparatus 300 shown in FIG. 9 will be briefly described. The receiver 302 receives a transport stream TS sent from the transmission apparatus 100 through broadcasting waves or network packets. The transport stream TS is supplied to the system decoder 303. The system decoder 303 extracts a basic video stream STb and an extended video stream STe from the transport stream TS.

The basic video stream STb, which is extracted by the system decoder 303, is supplied to the decoding section 304b of the video decoder 304. The decoding section 304b decodes the basic video stream STb to obtain the SDR transmission video data V1'. Further, the decoding section 304b extracts a parameter set and an SEI message, which are inserted into the basic video stream STb, and sends the parameter set and the SEI message to the controller 301.

Further, the extended video stream STe extracted by the system decoder 303 is supplied to the decoding section 304e of the video decoder 304. Using the SDR transmission video data V1', the decoding section 304e decodes the extended video stream STe to obtain the HDR transmission video data V2'. Further, a decoding section 304e extracts the parameter set and the SEI message, which are inserted into each access unit of the extended video stream STe, and sends the parameter set and the SEI message to the controller 301.

The controller 301 recognizes the HDR opto-electronic conversion characteristic (e.g., STD-B67, ST2084) on the basis of the HDR conversion characteristic meta-information "Transfer characteristics 2" in the dynamic range SEI message. Then, the HDR electro-optical conversion characteristic that is a characteristic inverse to the HDR opto-electronic conversion characteristic is set in the HDR electro-optical converter 305.

The HDR transmission video data V2' obtained by the video decoder 304 (decoding section 304e) is supplied to the HDR electro-optical converter 305. The HDR electro-optical converter 305 applies the HDR electro-optical conversion characteristic to the HDR transmission video data V2' to obtain the HDR video data V2 that is video data for display.

The HDR video data V2 obtained by the HDR electro-optical converter 305 is supplied to the HDR display mapper 306. The HDR display mapper 306 adjusts the display luminance of the HDR video data V2 on the basis of the meta-information for display control in the dynamic range SEI message (see FIG. 10).

The output video data of the HDR display mapper 306 is supplied to the CE monitor 307. The HDR image is displayed on the CE monitor 307, using the HDR video data the display luminance of which has been adjusted.

As described above, in the transmission and reception system 10 shown in FIG. 1, the HDR conversion characteristic meta-information is inserted into the area of the SEI NAL unit of the extended video stream STe and sent. Thus, it becomes possible for the HDR-compliant receiver to suitably perform electro-optical conversion processing on the HDR transmission video data V2' obtained by processing the basic video stream STb and the extended video stream STe on the basis of the HDR conversion characteristic meta-information.

Further, in the transmission and reception system 10 shown in FIG. 1, the SDR conversion characteristic meta-information is inserted into the area of the SPS NAL unit of the basic video stream STb and sent. Thus, it becomes possible for the SDR-compliant receiver to suitably perform electro-optical conversion processing on the SDR transmission video data V1' obtained by processing the basic video stream STb on the basis of the SDR conversion characteristic meta-information.

Further, in the transmission and reception system 10 shown in FIG. 1, the meta-information for display control is inserted into the area of the SEI NAL unit of the extended video stream STe together with the HDR conversion characteristic meta-information and sent. Therefore, it is possible for the HDR-compliant receiver to suitably control the display luminance using the meta-information for display control. In this case, the meta-information for display control includes area information indicating an area in which luminance conversion is allowed. The luminance conversion according to the display-luminance capability of the CE monitor, for example, is performed only in the area in which luminance conversion is allowed. Thus, it becomes possible to favorably reproduce video having a luminance intended by a producer.

2. Modified Example

Note that, in the above-mentioned embodiment, the example in which the meta-information indicating the characteristic of the HDR opto-electronic conversion is inserted into the area of the SEI NAL unit of the extended video stream STe has been shown. However, it is also conceivable that the meta-information indicating the characteristic of the HDR opto-electronic conversion is inserted into the area of the SEI NAL unit of the basic video stream STb. Also in this case, it becomes possible for the HDR-compliant receiver to suitably perform electro-optical conversion processing on the HDR transmission video data V2 on the basis of the meta-information indicating the characteristic of the HDR opto-electronic conversion.

The present technology is also applicable to a case of transmitting a video stream according to the HDR transmission video data V2' obtained by applying the characteristic of the HDR opto-electronic conversion that is the hybrid log-gamma (e.g., STD-B67) to, for example, the HDR video data, as a video stream for downward compatibility with the SDR. Also in this case, the meta-information indicating the characteristic of the HDR opto-electronic conversion is inserted into the area of the SEI NAL unit of the video stream. Thus, it becomes possible for the HDR-compliant receiver to suitably perform electro-optical conversion processing on the HDR transmission video data V2' on the basis of the meta-information indicating the characteristic of the HDR opto-electronic conversion.

Further, in the above-mentioned embodiment, the example in which, in the reception apparatus 200, 300, the electro-optical conversion processing is performed by the electro-optical converter 205, 305 and the adjustment of the display luminance according to the maximum luminance display capability of the CE monitor 207, 307 is performed by the display mapper 206, 306 has been shown. However, by reflecting a luminance conversion characteristic to an electro-optical conversion characteristic (EOTF), the electro-optical conversion processing and the adjustment of the display luminance can be performed only by the electro-optical converter 205, 305 at the same time.

Further, in the above-mentioned embodiment, the example in which the container is the transport stream (MPEG-2 TS) has been shown. However, the present technology is not limited to the case where the TS is used as the transport. The layer of the video can be realized by the identical method also in the case of using other packets such as ISO base media file format (ISOBMFF) and MPEG Media Transport (MMT).

It should be noted that the present technology may also take the following configurations.

(1) A transmission apparatus, including:
an opto-electronic converter configured to perform high dynamic range opto-electronic conversion on high dynamic range video data to obtain high dynamic range transmission video data; an encoder configured to
receive input of at least the high dynamic range transmission video data and output a video stream including coded video data; a transmitter configured to send the video stream; and
an information inserter configured to insert high dynamic range conversion characteristic meta-information into an area of a supplemental enhancement information (SEI) network abstraction layer (NAL) unit of the video stream, the high dynamic range conversion characteristic meta-information indicating
a characteristic of the high dynamic range opto-electronic conversion or a characteristic of high dynamic range electro-optical conversion, which corresponds to the characteristic of the high dynamic range opto-electronic conversion. (2) The transmission apparatus according to (1),
in which
the encoder is further configured to
receive input of standard dynamic range transmission video data obtained by performing standard dynamic range opto-electronic conversion on standard dynamic range video data, together with the high dynamic range transmission video data,
and output
a basic video stream including coded video data obtained by subjecting the standard dynamic range transmission video data to predictive coding, and
an extended video stream including coded video data obtained by subjecting the high dynamic range transmission video data to predictive coding using the standard dynamic range transmission video data, and the information inserter is further configured to
insert the high dynamic range conversion characteristic meta-information into an area of an SEI NAL unit of the extended video stream, and
insert standard dynamic range conversion characteristic meta-information into an area of a sequence parameter set (SPS) NAL unit of the basic video stream, the standard dynamic range conversion characteristic meta-information indicating a characteristic of the standard dynamic range opto-electronic conversion. (3) The transmission apparatus according to (1) or (2),
in which
the information inserter is further configured to insert meta-information for display control into the area of the SEI NAL unit together with the high dynamic range conversion characteristic meta-information. (4) The transmission apparatus according to (3), in which the meta-information for display control includes peak luminance information. (5) The transmission apparatus according to (4), in which the meta-information for display control further includes area information indicating an area in which luminance conversion is allowed. (6) A transmission method, including:

performing high dynamic range opto-electronic conversion on high dynamic range video data to obtain high dynamic range transmission video data; inputting at least the high dynamic range transmission video data and outputting a video stream including coded video data;

sending the video stream by a transmitter; and inserting high dynamic range conversion characteristic meta-information into an area of an SEI NAL unit of the video stream, the high dynamic range conversion characteristic meta-information indicating a characteristic of the high dynamic range opto-electronic conversion or a characteristic of high dynamic range electro-optical conversion, which corresponds to the characteristic of the high dynamic range opto-electronic conversion. (7) A reception apparatus, including:

a receiver configured to receive a video stream; a decoder configured to decode the video stream to obtain high dynamic range transmission video data, the video stream including an area of an SEI NAL unit, into which high dynamic range conversion characteristic meta-information is inserted, the high dynamic range conversion characteristic meta-information indicating a characteristic of high dynamic range opto-electronic conversion or a characteristic of high dynamic range electro-optical conversion, which corresponds to the characteristic of the high dynamic range opto-electronic conversion; and an electro-optical converter configured to perform high dynamic range electro-optical conversion on the high dynamic range transmission video data on the basis of the high dynamic range conversion characteristic meta-information to obtain video data for display.

(8) The reception apparatus according to (7), in which the receiver is further configured to receive a basic video stream including coded video data obtained by subjecting standard dynamic range transmission video data to predictive coding, and an extended video stream including coded video data obtained by subjecting the high dynamic range transmission video data to predictive coding using the standard dynamic range transmission video data, the decoder is further configured to decode the basic video stream to obtain the standard dynamic range transmission video data, and decode the extended video stream using the standard dynamic range transmission video data to obtain the high dynamic range transmission video data, and the high dynamic range conversion characteristic meta-information is inserted into an area of an SEI NAL unit of the extended video stream. (9) The reception apparatus according to (7) or (8), in which peak luminance information is further inserted into the area of the SEI NAL unit, further including a luminance adjuster configured to adjust a display luminance of the video data for display on the basis of the peak luminance information. (10) The reception apparatus according to (9), in which area information indicating an area in which luminance conversion is allowed is further inserted into the area of the SEI NAL unit, and the luminance adjuster is further configured to adjust the display luminance in the area in which luminance conversion is allowed, on the basis of the area information indicating the area in which luminance conversion is allowed.

(11) A reception method, including:

receiving a video stream by a receiver; decoding the video stream to obtain high dynamic range transmission video data, the video stream including an area of an SEI NAL unit, into which high dynamic range conversion characteristic meta-information is inserted, the high dynamic range conversion characteristic meta-information indicating a characteristic of high dynamic range opto-electronic conversion or a characteristic of high dynamic range electro-optical conversion, which corresponds to the characteristic of the high dynamic range opto-electronic conversion; and performing high dynamic range electro-optical conversion on the high dynamic range transmission video data on the basis of the high dynamic range conversion characteristic meta-information to obtain video data for display.

(12) A transmission apparatus, includes circuitry configured to perform high dynamic range (HDR) opto-electronic conversion on HDR video data to obtain HDR transmission video data;

an encoder configured to receive input of at least the HDR transmission video data and output a video stream including coded video data; and a transmitter configured to send the video stream, wherein the circuitry is configured to insert HDR conversion characteristic meta-information into the video stream, the HDR conversion characteristic meta-information indicating a characteristic of the HDR conversion. (13)

A transmission apparatus according to 12, wherein the encoder is further configured to receive as input standard dynamic range (SDR) transmission video data obtained by performing SDR opto-electronic conversion on SDR video data, together with the HDR transmission video data, and output a base video stream including coded video data obtained by subjecting the SDR transmission video data to predictive coding, and an extended video stream including coded video data obtained by subjecting the HDR transmission video data to predictive coding using the SDR transmission video data, wherein the circuitry is further configured to insert the HDR conversion characteristic meta-information into a supplemental enhancement information (SEI) network abstraction layer (NAL) portion of the extended video stream, and insert SDR conversion characteristic meta-information into a sequence parameter set (SPS) NAL portion of the base video stream, the SDR conversion characteristic meta-information indicating a characteristic of the SDR opto-electronic conversion. (14)

a transmission apparatus according to 12, wherein the circuitry is further configured to insert meta-information for display control into the SEI NAL portion together with the HDR conversion characteristic meta-information.

(15) A transmission apparatus according to 14, wherein the meta-information for display control includes peak luminance information.

(16) A transmission apparatus according to claim 15, wherein the meta-information for display control further includes area information indicating an area in which luminance conversion is allowed.

(17) A transmission apparatus according to 12, wherein the HDR opto-electronic conversion includes at least one of optical-to-electronic conversion and electronic-to-optical conversation.

(18) A transmission method, includes:
performing with circuitry high dynamic range (HDR) opto-electronic conversion on HDR video data to obtain HDR transmission video data;
receiving as input at least the HDR transmission video data and outputting a video stream including coded video data;
inserting HDR conversion characteristic meta-information the video stream, the HDR conversion characteristic meta-information indicating a characteristic of the HDR conversion; and
sending the video stream by a transmitter.

(19) The transmission method of (18), further including:
receiving standard dynamic range (SDR) transmission video data obtained by performing SDR opto-electronic conversion on SDR video data, together with the HDR transmission video data; outputting
a base video stream including coded video data obtained by subjecting the SDR transmission video data to predictive coding, and outputting an extended video stream including coded video data obtained by subjecting the HDR transmission video data to predictive coding using the SDR transmission video data;
inserting the HDR conversion characteristic meta-information into a supplemental enhancement information (SEI) network abstraction layer (NAL) portion of the extended video stream; and
inserting SDR conversion characteristic meta-information into a sequence parameter set (SPS) NAL portion of the base video stream, the SDR conversion characteristic meta-information indicating a characteristic of the SDR opto-electronic conversion.

(20) The transmission method of (18), wherein the HDR opto-electronic conversion includes at least one of optical-to-electronic conversion and electronic-to-optical conversation.

(21) A reception apparatus, includes
a receiver configured to receive a video stream;
a decoder configured to decode the video stream to obtain high dynamic range (HDR) transmission video data, the video stream including HDR conversion characteristic meta-information that indicates a characteristic of the HDR conversion; and
circuitry configured to perform HDR electro-optical conversion on the HDR transmission video data based on the HDR conversion characteristic meta-information to obtain video data for display.

(22) The reception apparatus according to (21), further comprising:
a display configured to display an image corresponding to the video data.

(23) The reception apparatus according to (21), wherein the video stream includes
a base video stream including coded video data obtained by subjecting standard dynamic range (SDR) transmission video data to predictive coding, and
an extended video stream including coded video data obtained by subjecting the HDR transmission video data to predictive coding using the SDR transmission video data,
the decoder is further configured to
decode the base video stream to obtain the SDR transmission video data, and
decode the extended video stream to obtain the HDR transmission video data, wherein the HDR conversion characteristic meta-information being included in a supplemental enhancement information (SEI) network abstraction layer (NAL) portion of the extended video stream.

(24) The reception apparatus according to (23), wherein
the circuitry is configured to adjust a display luminance of the video data for display based on peak luminance information included in the SEI NAL.

(25) The reception apparatus according to (24), wherein
the circuitry is further configured to
obtain area information indicating an area in which luminance conversion is allowed from the SEI NAL, and
adjust the display luminance in the area in which luminance conversion is allowed, based on the area information.

(26) A reception method, including:
receiving a video stream with a receiver;
decoding with a decoder the video stream to obtain high dynamic range (HDR) transmission video data, the video stream including a supplemental enhancement information (SEI) network abstraction layer (NAL) portion in which HDR conversion characteristic meta-information is included, the HDR conversion characteristic meta-information indicating a characteristic of HDR conversion; and
performing HDR electro-optical conversion on the HDR transmission video data based on the HDR conversion characteristic meta-information to obtain video data for display.

(27) The reception method according to (26), further including:
displaying the video data on a display.

(28) The reception method according to (26), wherein:
the video stream includes
a base video stream including coded video data obtained by subjecting standard dynamic range (SDR) transmission video data to predictive coding, and
an extended video stream including coded video data obtained by subjecting the HDR transmission video data to predictive coding using the SDR transmission video data, and
the decoding includes decoding the base video stream to obtain the SDR transmission video data, and
decoding the extended video stream to obtain the HDR transmission video data, wherein the HDR conversion characteristic meta-information being included in a supplemental enhancement information (SEI) network abstraction layer (NAL) portion of the extended video stream.

(29) The reception method according to (28), further including:
adjusting a display luminance of the video data for display based on peak luminance information included in the SEI NAL.

(30) The reception method according to (29), further including:
obtaining area information indicating an area in which luminance conversion is allowed from the SEI NAL, and
adjusting the display luminance in the area in which luminance conversion is allowed, based on the area information.

(31) The reception method according to (26), wherein
the HDR electro-optical conversion includes at least one of optical-to-electronic conversion and electronic-to-optical conversation.

A main feature of the present technology is to insert the HDR conversion characteristic meta-information into the area of the SEI NAL unit of the video stream and send it, such that the HDR-compliant receiver can suitably perform electro-optical conversion processing on the HDR transmission video data on the basis of the HDR conversion characteristic meta-information (see FIGS. 5 and 7), the HDR conversion characteristic meta-information indicating the characteristic of the HDR opto-electronic conversion or the characteristic of HDR electro-optical conversion, which corresponds to the characteristic of the HDR opto-electronic conversion.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Transmission and reception system
100 Transmission apparatus
101 Controller
102 SDR opto-electronic converter
103 HDR opto-electronic converter
104 Video encoder
104b, 104e Encoding section
105 System encoder
106 Transmitter
200, 300 Reception apparatus
201, 301 Controller
202, 302 Receiver
203, 303 System decoder
204, 304 Video decoder
204b Decoding section
205 SDR electro-optical converter
206 SDR display mapper
207, 307 CE monitor
304b, 304e Decoding section
305 HDR electro-optical converter
306 HDR display mapper

The invention claimed is:

1. A transmission apparatus, comprising:
circuitry configured to
perform high dynamic range (HDR) opto-electronic conversion on HDR video data to obtain HDR transmission video data,
encode the HDR transmission video data and output a video stream including coded HDR transmission video data,
insert conversion characteristic meta-information into supplemental enhancement information (SEI) and video usability information (VUI) of the video stream,
insert peak luminance information into the video stream, and
send the video stream, wherein
a display luminance of the HDR transmission video data is adjusted based on the peak luminance information included in the video stream, electro-optical conversion on the HDR transmission video data is based on the conversion characteristic meta-information of the SEI when the conversion characteristic meta-information is inserted into the SEI and the VUI.

2. The transmission apparatus according to claim 1, wherein the circuitry is further configured to
perform standard dynamic range (SDR) opto-electronic conversion on SDR video data to obtain SDR transmission video data,
perform predictive coding on the SDR transmission video data to obtain a base video stream including coded SDR transmission video data,
perform predictive coding on the HDR transmission video data using the SDR transmission video data to obtain an extended video stream including the coded HDR transmission video data,
insert the conversion characteristic meta-information into an SEI network abstraction layer (NAL) portion of the extended video stream, and
insert SDR conversion characteristic meta-information into a sequence parameter set (SPS) NAL portion of the base video stream, the SDR conversion characteristic meta-information indicating a characteristic of the SDR opto-electronic conversion.

3. The transmission apparatus according to claim 2, wherein
the circuitry is further configured to insert meta-information for display control into the SEI NAL portion of the extended video stream together with the conversion characteristic meta-information.

4. The transmission apparatus according to claim 3, wherein
the meta-information for display control includes the peak luminance information.

5. The transmission apparatus according to claim 3, wherein
the meta-information for display control includes area information indicating an area in which luminance conversion is allowed.

6. The transmission apparatus according to claim 1, wherein
a conversion characteristic indicated by the conversion characteristic meta-information is of at least one of optical-to-electronic conversion and electronic-to-optical conversion.

7. A transmission method, comprising:
performing, by circuitry of a transmission apparatus, high dynamic range (HDR) opto-electronic conversion on HDR video data to obtain HDR transmission video data;
encoding the HDR transmission video data and outputting a video stream including coded HDR transmission video data;

inserting conversion characteristic meta-information into supplemental enhancement information (SEI) and video usability information (VUI) of the video stream;

inserting peak luminance information into the video stream; and sending the video stream, wherein a display luminance of the HDR transmission video data is adjusted based on the peak luminance information included in the video stream, electro-optical conversion on the HDR transmission video data is based on the conversion characteristic meta-information of the SEI when the conversion characteristic meta-information is inserted into the SEI and the VUI.

8. The transmission method of claim 7, further comprising:

performing standard dynamic range (SDR) opto-electronic conversion on SDR video data to obtain SDR transmission video data;

performing predictive coding on the SDR transmission video data to obtain a base video stream including coded SDR transmission video data;

performing predictive coding on the HDR transmission video data using the SDR transmission video data to obtain an extended video stream including the coded HDR transmission video data;

inserting the conversion characteristic meta-information into an SEI network abstraction layer (NAL) portion of the extended video stream; and inserting SDR conversion characteristic meta-information into a sequence parameter set (SPS) NAL portion of the base video stream, the SDR conversion characteristic meta-information indicating a characteristic of the SDR opto-electronic conversion.

9. The transmission method of claim 7, wherein a conversion characteristic indicated by the conversion characteristic meta-information is of at least one of optical-to-electronic conversion and electronic-to-optical conversion.

10. A reception apparatus, comprising:

circuitry configured to receive a video stream;

decode the video stream to obtain high dynamic range (HDR) transmission video data, the video stream including conversion characteristic meta-information and peak luminance information, the conversion characteristic meta-information being inserted into supplemental enhancement information (SEI) and video usability information (VUI) of the video stream;

perform HDR electro-optical conversion on the HDR transmission video data based on the conversion characteristic meta-information of the SEI to obtain video data for display when the conversion characteristic meta-information is inserted into the SEI and the VUI; and adjust a display luminance of the HDR transmission video data based on the peak luminance information included in the video stream.

11. The reception apparatus according to claim 10, further comprising:

a display configured to display an image corresponding to the video data.

12. The reception apparatus according to claim 10, wherein the video stream includes a base video stream including coded standard dynamic range (SDR) transmission video data obtained by performing predictive coding on SDR transmission video data, and an extended video stream including coded HDR video data obtained by performing predictive coding on the HDR transmission video data using the SDR transmission video data, and the circuitry is further configured to decode the base video stream to obtain the SDR transmission video data, and decode the extended video stream to obtain the HDR transmission video data, the conversion characteristic meta-information being included in an SEI network abstraction layer (NAL) portion of the extended video stream.

13. The reception apparatus according to claim 12, wherein the peak luminance information is included in the SEI NAL of the extended video stream.

14. The reception apparatus according to claim 13, wherein the circuitry is further configured to obtain area information indicating an area in which luminance conversion is allowed from the SEI NAL of the extended video stream, and adjust the display luminance in the area in which luminance conversion is allowed, based on the area information.

15. A reception method, comprising:

receiving a video stream;

decoding the video stream to obtain high dynamic range (HDR) transmission video data, the video stream including conversion characteristic meta-information and peak luminance information, the conversion characteristic meta-information being inserted into supplemental enhancement information (SEI) and video usability information (VUI) of the video stream;

performing HDR electro-optical conversion on the HDR transmission video data based on the conversion characteristic meta-information to obtain video data for display when the conversion characteristic meta-information is inserted into the SEI and the VUI; and adjusting a display luminance of the HDR transmission video data based on the peak luminance information included in the video stream.

16. The reception method according to claim 15, further comprising:

displaying the video data on a display.

17. The reception method according to claim 15, wherein:

the video stream includes a base video stream including coded standard dynamic range (SDR) transmission video data obtained by performing predictive coding on SDR transmission video data to predictive coding, and an extended video stream including coded HDR video data obtained by performing predictive coding on the HDR transmission video data using the SDR transmission video data; and the reception method further comprises decoding the base video stream to obtain the SDR transmission video data, and decoding the extended video stream to obtain the HDR transmission video data, the conversion characteristic meta-information being included in an SEI network abstraction layer (NAL) portion of the extended video stream.

18. The reception method according to claim 17, wherein the peak luminance information is included in the SEI NAL of the extended video stream.

19. The reception method according to claim 17, further comprising:
obtaining area information indicating an area in which luminance conversion is allowed from the SEI NAL of the extended video stream; and
adjusting the display luminance in the area in which luminance conversion is allowed, based on the area information.

20. The reception method according to claim 15, wherein a conversion characteristic indicated by the conversion characteristic meta-information is of at least one of optical-to-electronic conversion and electronic-to-optical conversion.

21. A reception apparatus, comprising:
circuitry configured to
receive a video stream;
decode the video stream to obtain high dynamic range (HDR) transmission video data, the video stream including conversion characteristic meta-information and peak luminance information, the conversion characteristic meta-information being inserted into supplemental enhancement information (SEI) and video usability information (VUI) of the video stream;
perform HDR electro-optical conversion on the HDR transmission video data based on the conversion characteristic meta-information to obtain video data for display when the conversion characteristic meta-information is inserted into the SEI and the VUI; and
adjust a display luminance of the HDR transmission video data or the converted video data based on the peak luminance information included in the video stream.

22. The reception apparatus according to claim 21, wherein
the HDR electro-optical conversion and the adjustment of the display luminance are performed in a sequence or at the same time.

23. The reception apparatus according to claim 21, further comprising:
a display configured to display an image corresponding to the video data.

24. The reception apparatus according to claim 21, wherein
a conversion characteristic indicated by the conversion characteristic meta-information is of at least one of optical-to-electronic conversion and electronic-to-optical conversion.

* * * * *